United States Patent
Gupta et al.

(10) Patent No.: US 11,570,048 B2
(45) Date of Patent: *Jan. 31, 2023

(54) DECLARATIVE LANGUAGE AND COMPILER FOR PROVISIONING AND DEPLOYING DATA CENTERS ON CLOUD PLATFORMS

(71) Applicant: salesforce.com, inc., San Francisco, CA (US)

(72) Inventors: Varun Gupta, Berkeley, CA (US); Joshua Paul Meier, Concord, CA (US); Srinivas Dhruvakumar, Vancouver (CA); Mayakrishnan Chakkarapani, Fremont, CA (US); Christopher Steven Moyes, San Mateo, CA (US); Jeremiah David Brazeau, Hudson, NH (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,605

(22) Filed: Apr. 19, 2021

(65) Prior Publication Data
US 2022/0150121 A1     May 12, 2022

Related U.S. Application Data

(63) Continuation of application No. 17/092,020, filed on Nov. 6, 2020, now Pat. No. 11,018,938.

(51) Int. Cl.
*G06F 15/173*  (2006.01)
*H04L 41/0866*  (2022.01)
*H04L 41/0813*  (2022.01)

(52) U.S. Cl.
CPC ...... *H04L 41/0866* (2013.01); *H04L 41/0813* (2013.01)

(58) Field of Classification Search
CPC .............. H04L 41/0866; H04L 41/0813
See application file for complete search history.

(56) References Cited

U.S. PATENT DOCUMENTS 11,388,231 B1 *  7/2022  Magana Perdomo ...................... H04L 67/1097
11,392,366 B1 *  7/2022  Wiegley .................... G06F 8/65
(Continued)

OTHER PUBLICATIONS

Burns, E., "Why Spinnaker matters to CI/CD," Aug. 27, 2019, seven pages, [Online] [Retrieved on Jan. 19, 2021] Retrieved from the Internet <URL: https://opensource.com/article/19/8/why-spinnaker-matters-cicd&g-t;>.

(Continued)

*Primary Examiner* — Thanh T Nguyen
(74) *Attorney, Agent, or Firm* — Fenwick & West LLP

(57) ABSTRACT

A system is presented for provisioning resources on a target cloud platform based on a platform-independent specification of a data center. The system identifies data center entities represented within the platform-independent declarative specification and generates data structures and metadata representations of the data center entities. The system then generates instructions for provisioning services or deploying applications for creating one or more services on the target cloud platform based on the data structures and metadata representations of the data center entities according to the declarative specification. The system sends the generated instructions for execution on the target cloud computing platform, where the target cloud computing platform executes the instructions to generate the data center. The system provides users with access to the computing resources of the data center created by the cloud computing platform.

20 Claims, 10 Drawing Sheets

(56) References Cited

U.S. PATENT DOCUMENTS

| | | | |
|---|---|---|---|
| 2014/0337474 A1 | 11/2014 | Khuti et al. | |
| 2014/0379895 A1 | 12/2014 | Jain | |
| 2015/0355934 A1 | 12/2015 | Yin et al. | |
| 2017/0193605 A1 | 7/2017 | Narendran et al. | |
| 2017/0286252 A1 | 10/2017 | Illikkal et al. | |
| 2020/0171382 A1 | 6/2020 | Agoston | |
| 2022/0095144 A1* | 3/2022 | Ren | H04W 24/02 |
| 2022/0222079 A1* | 7/2022 | Vergara | G06F 9/4881 |
| 2022/0236976 A1* | 7/2022 | Wiegley | G06F 8/65 |

OTHER PUBLICATIONS

Mukherjee, J., "What is a continuous delivery pipeline?" Date Unknown, 14 pages, [Online] [Retrieved on Jan. 19, 2021] Retrieved from the Internet <URL: https://www.atlassian.com/continuous-delivery/pipeline>.

Thakur, V., "Continuous Delivery Pipeline for Kubernetes Using Spinnaker," May 27, 2020, 21 pages, [Online] [Retrieved on Jan. 19, 2021] Retrieved from the Internet <URL https://www.metricfire.com/blog/continuous-delivery-pipeline-for-kubernet-es-using-spinnaker/?GAID=undefined&GAID=undefined>.

* cited by examiner

DECLARATIVE LANGUAGE AND COMPILER FOR PROVISIONING AND DEPLOYING DATA CENTERS ON CLOUD PLATFORMS

CROSS REFERENCE TO RELATED APPLICATIONS

This application claims the benefit of U.S. patent application Ser. No. 17/092,020 filed on Nov. 6, 2020, which is incorporated herein by reference in its entirety.

BACKGROUND

Field of Art

This disclosure relates in general to cloud computing platforms, and in particular to provisioning resources for a data center on a cloud platform based on a platform-independent declarative specification of the data center.

Description of the Related Art

Cloud computing platforms (or cloud platforms) such as Amazon Web Services™ (AWS™), Google Cloud Platform™ (GCP™), Azure™, have become increasingly popular in providing software, platform, and infrastructure services to entities. For instance, cloud platforms may provide on-demand network access to servers, storage, databases, content delivery, and other services that may be used to integrate technical and non-technical solutions. Conventional data centers needed by organizations were built, maintained and modified by the organizations themselves. However, given the significant overhead in building, maintaining, and modifying them, organizations are shifting data centers to cloud platforms that provide scalability and elasticity of the required resources.

Organizations maintaining cloud infrastructure on cloud platforms may use continuous delivery platforms that can manage and deploy applications on cloud platforms. Such continuous delivery platforms allow organizations to simplify software deployment process and manage applications, firewalls, clusters, servers, load balancers, and other computing infrastructure on the cloud platform. However, maintaining large data centers on a cloud platform using a continuous delivery platform can be complex. Such large data centers may require maintaining millions of lines of instructions of such platforms. Furthermore, multi-tenant systems manage data and applications for a large number of organizations representing tenants of the multi-tenant system. Infrastructure as code may be used for provisioning and deploying data centers using code rather than physical hardware configuration files or interactive configuration tools. However, significant challenges remain in provisioning resources on a target cloud platform using a platform-independent declarative specification of a data center.

Figure 1:
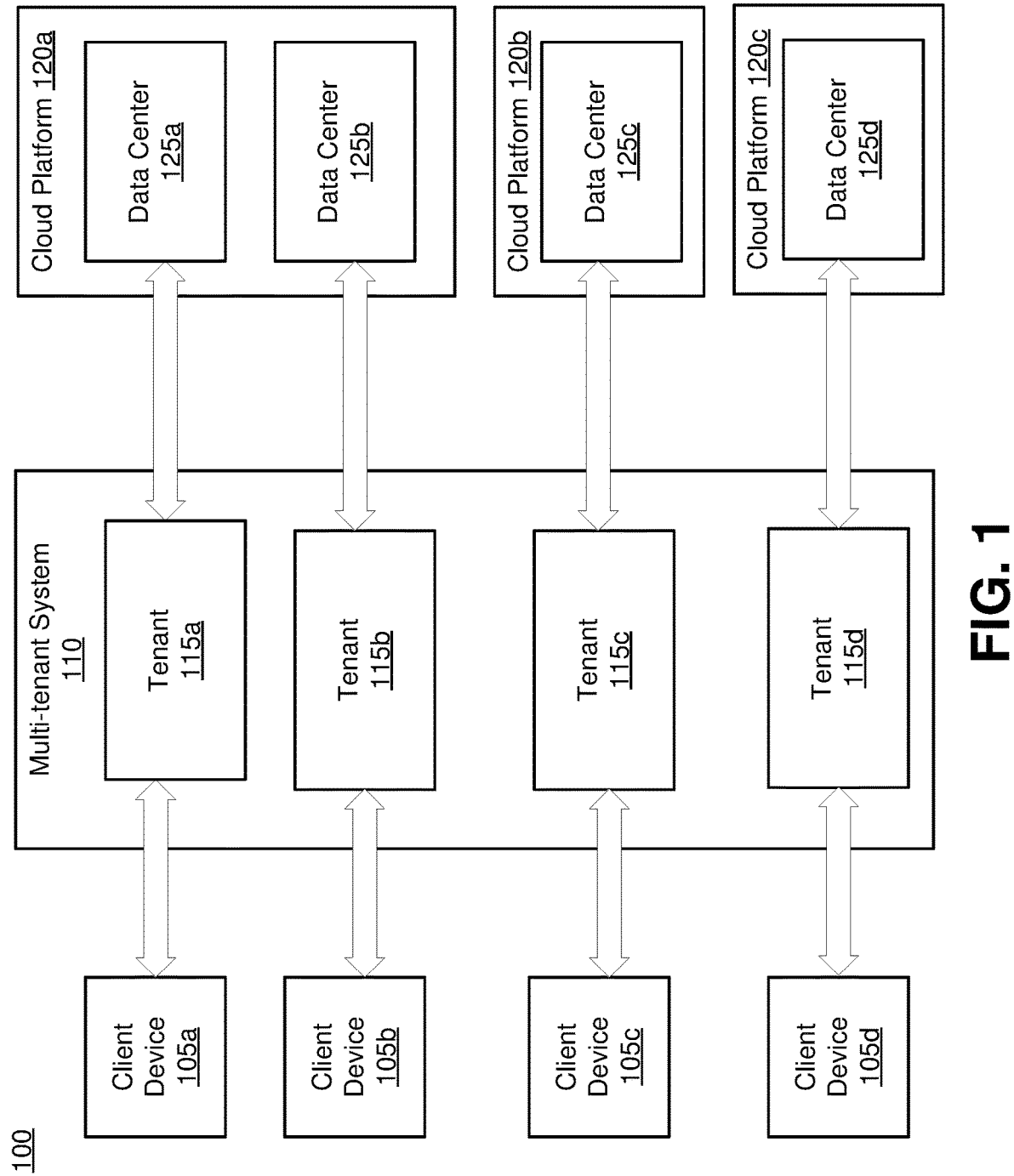
FIG. 1 is a block diagram of a system environment illustrating a multi-tenant system configuring data centers on cloud platforms, according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Enterprises can create a data center using a cloud platform for use by users of the enterprise. Infrastructure as code may be used for provisioning and deploying data centers using code rather than physical hardware configuration files or interactive configuration tools. However, significant challenges remain in ensuring audit tracking of changes made to a platform-independent declarative specification of a data center that may be subsequently provisioned and deployed on a target cloud platform.

Embodiments provide auditing when computing systems (or systems) generate data centers on a target cloud platform using a cloud platform infrastructure language that is cloud platform independent. The system receives a platform-independent declarative specification of the data center from a user and an identification of the target cloud platform for deploying a data center based on the platform-independent declarative specification. The system receives a modified platform-independent declarative specification of the data center based on a set of one or more changes to the platform-independent declarative specification. The system stores a generated snapshot of the modified platform-independent declarative specification. The system receives a platform-specific metadata representation of the data center based on a compilation of the modified platform-independent declarative specification. The system associates the platform-specific metadata representation of the data center with a unique identifier. The system associates the stored snapshot of the modified platform-independent declarative specification with the unique identifier. In response to a provisioning of cloud resources based on the platform-specific metadata representation, the system associates the provisioning of cloud resources with the unique identifier. In response to a deployment of the data center based on the platform-specific metadata representation, the system associates the deployment of the data center with the unique identifier.

In embodiments described herein, the system receives an audit request based a data center entity associated with one of: a platform specific metadata representation of the data center, a provisioning of cloud resources, or a deployment of the data center. In response to the audit request, the system provides information describing one or more changes in the set of changes associated with the data center entity based on an associated identifier.

Overall System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105. With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

A cloud platform may also be referred to as a cloud computing platform or a public cloud environment. A tenant may use the cloud platform infrastructure language to provide a declarative specification of a data center that is created on a target cloud platform 120. A tenant 115 may create one or more data centers on a cloud platform 120. A data center represents a set of computing resources including servers, applications, storage, memory, and so on that can be used by users, for example, users associated with the tenant.

The computing resources of a data center are secure and may not be accessed by users that are not authorized to access them. For example, a data center 125a that is created for users of tenant 115a may not be accessed by users of tenant 115b unless access is explicitly granted. Similarly, data center 125b that is created for users of tenant 115b may not be accessed by users of tenant 115a, unless access is explicitly granted. Furthermore, services provided by a data center may be accessed by computing systems outside the data center, only if access is granted to the computing systems in accordance with the declarative specification of the data center.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

Figure 2:
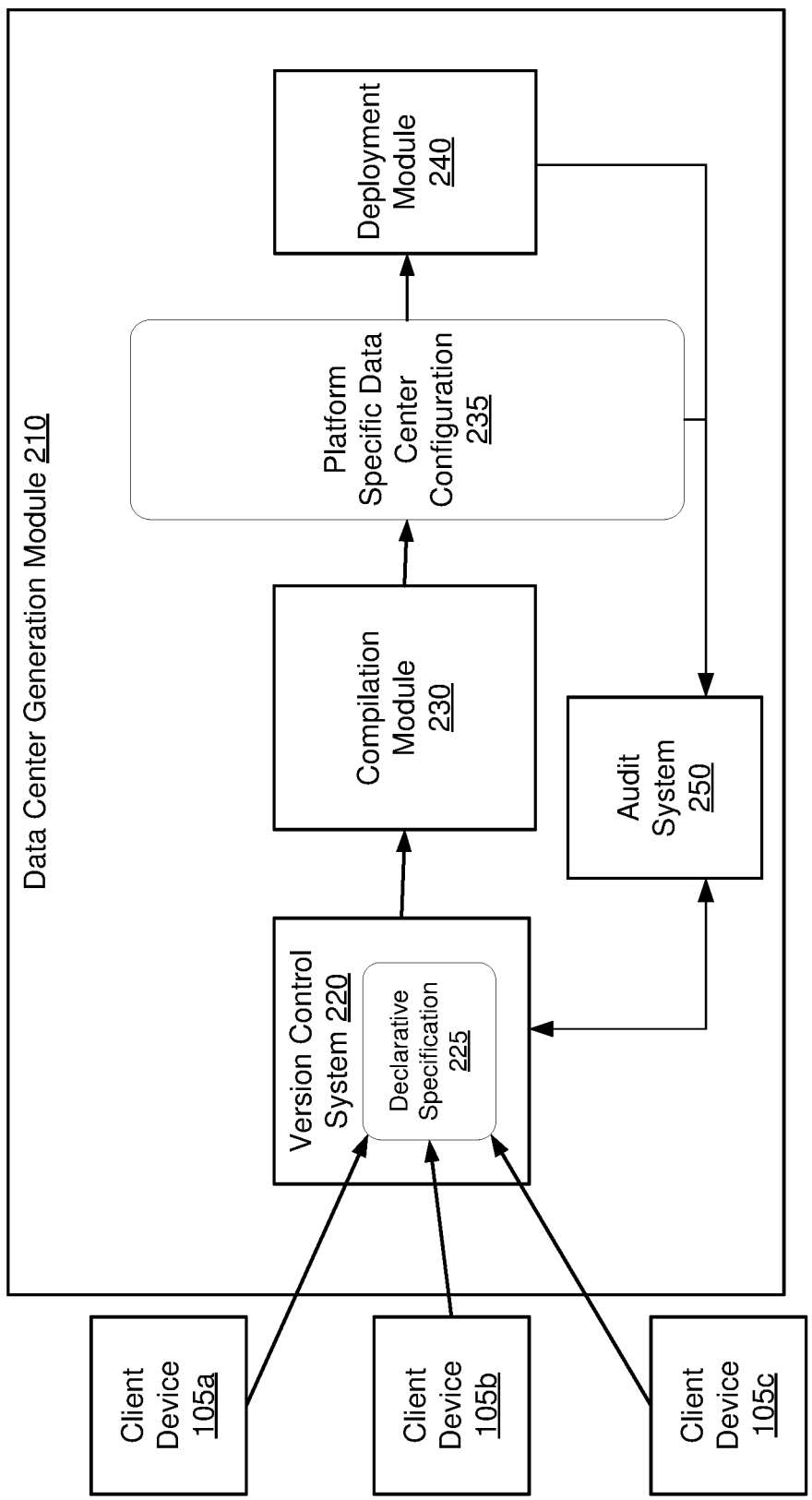
FIG. 2 is a block diagram illustrating the system architecture of a data center generation module, according to an embodiment.

FIG. 2 is a block diagram illustrating the system architecture of a data center generation module according to an embodiment. The data center generation module 210 comprises a version control system 220, a compilation module 230, a deployment module 240, and an audit system 250. Other embodiments can have different and/or other components than the ones described here, and that the functionalities can be distributed among the components in a different manner.

The version control system 220 stores one or more versions of a platform independent declarative specification 225 of a data center. The platform independent declarative specification 225 of a data center specifies various entities of the data center including the services available in the data center and their interactions. Expert users may modify the platform independent declarative specification, for example, using applications executing on client devices 105. The modifications to the platform independent declarative specification may be submitted via commit requests of the version control system 220. The version control system 220 allows users to create snapshots of the platform independent declarative specification at various stages of modifications, thereby allowing users to rollback certain changes and apply a previous version of the platform independent declarative specification.

The compilation module 230 receives the platform independent declarative specification 225 and a target cloud platform as input and generates a cloud platform specific metadata representation 235 for the target cloud platform. The architecture of the compilation module 230 and processes executed by the compilation module 230 are described in further detail herein, for example, in the description of FIG. 3. The deployment module 240 deploys the generated cloud platform specific metadata representation 235 on the target cloud platform to create a data center on the target cloud platform according to the declarative specification 225.

In some embodiments, the data center generation module 210 includes the audit system 250. Details of the architecture of the audit system 250 and the processes executed by the audit system 250 are provided in the description associated with FIG. 7-9.

Figure 3:
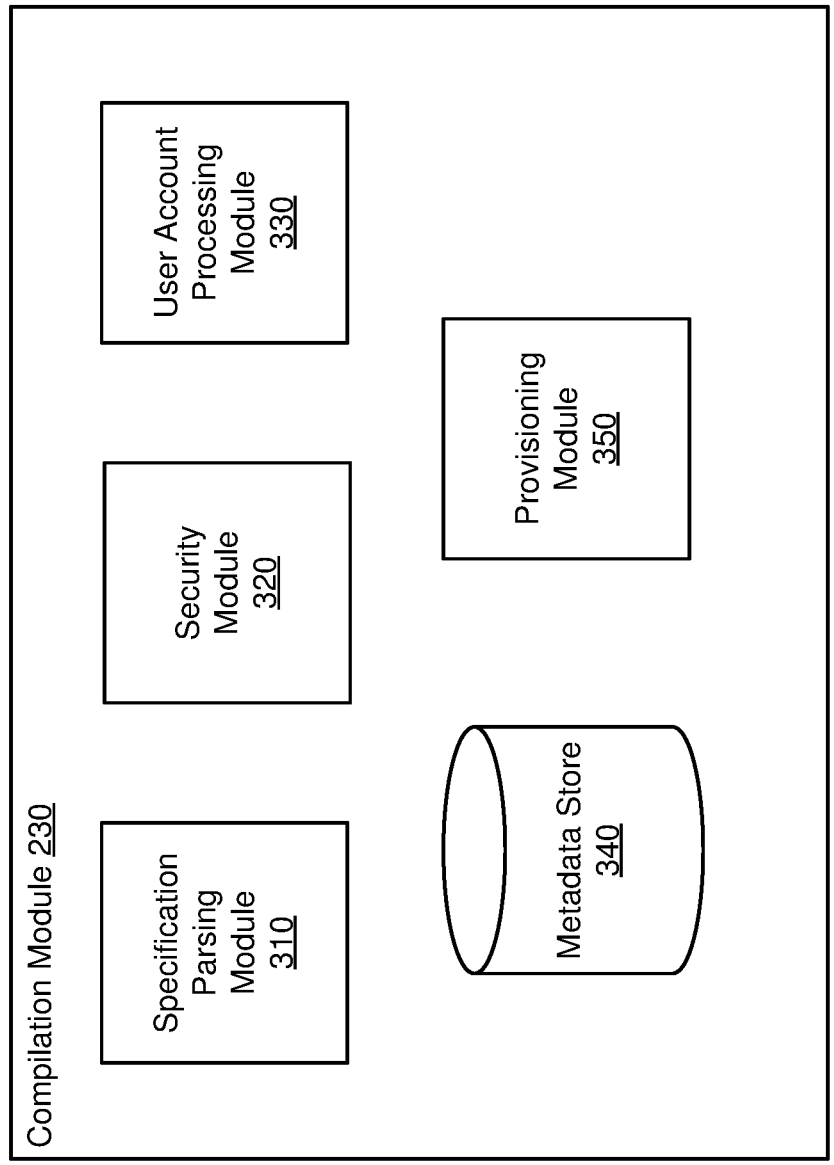
FIG. 3 is a block diagram illustrating the architecture of a compilation module, according to one embodiment.

FIG. 3 is a block diagram illustrating the architecture of a compilation module according to one embodiment. The compilation module 230 includes a specification parsing module 310, a security module 320, a user account processing module 330, a metadata store 340, and a provisioning module 350. Other embodiments may include more, fewer, or different modules than those indicated herein in FIG. 3.

The specification parsing module 310 parses a declarative specification 225 of a data center received as input by the compilation module 230. The specification parsing module 310 identifies individual data center entities represented within the declarative specification 225 of the data center. The specification parsing module 310 generates data structures and metadata representations of the data center entities and provides the generated data structures and metadata representations to other modules of the compilation module 230 for further processing.

The security module 320 handles security aspects of various data center entities that are specified in the declarative specification 225 of the data center. For example, the security module 320 ensures that interactions within various data center entities, interactions of data center entities with systems outside the data center generated conform to security policies specified within the declarative specification 225 of the data center. The security policy may specify which data center entities can be accessed by external systems, which external system may be accessed by specific data center entities, whether a service can interact with another service, whether a service group can interact with another service group, whether a service can access a specific functionality or API (application programming interface) supported by the cloud platform, and so on. An external system may be identified using an IP address or domain name.

The user account processing module 330 creates user accounts in the cloud platforms where the data center is being created. These user accounts are used for various purposes, for example, for debugging, simulation of data center, for interaction with team members and so on.

The metadata store 340 stores various transformed metadata representations of data centers that are generated by the compilation module 230. The transformed metadata representations may be used for performing rollback to a previous version if an issue is encountered in a current version of the data center. The transformed metadata representations may be used for validation, auditing, governance, and so on at various stages of the transformation process.

The provisioning module 350 creates instructions for provisioning resources on target cloud systems and executes them for deploying the data center. In an embodiment, the provisioning system creates pipelines for executing on the cloud platform. The pipelines comprise stages that include instructions for provisioning services or deploying applications for creating various services on the cloud platform according to the declarative specification describing the data center.

Figure 4:
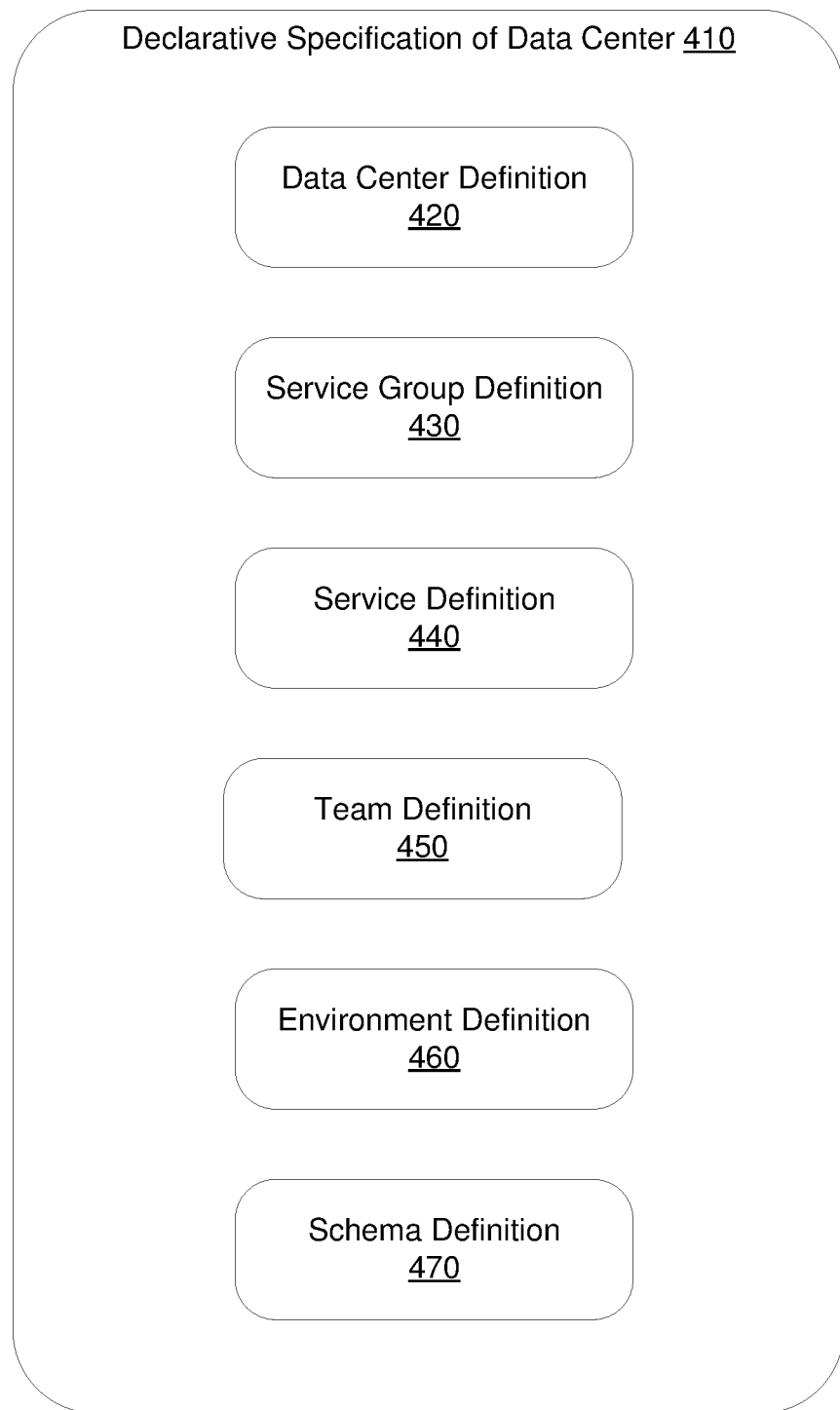
FIG. 4 illustrates an example of a data center declarative specification, according to one embodiment.

FIG. 4 illustrates an example of a declarative specification of a data center according to one embodiment. The declarative specification 410 includes multiple data center entities. A data center entity is an instance of a data center entity type and there can be multiple instances of each data center entity type. Examples of data center entities include data centers, service groups, services, teams, environments, and schemas.

The declarative specification 410 includes definitions of various types of data center entities including service group, service, team, environment, and schema. The declarative specification includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 420 represents a set of capabilities and features and services offered by one or more computing systems that can be built and delivered independently, in accordance with one embodiment. A service group may be also referred to as a logical service group, a functional unit, or a bounded context. A service group 420 may also be viewed a set of services of a set of cohesive technical use-case functionalities offered by one or more computing systems. A service group 420 enforces security boundaries. A service group 420 defines a scope for modifications. Thus, any modifications to an entity, such as a capability, feature, or service offered by one or more computing systems within a service group 420 may propagate as needed or suitable to entities within the service group, but does not propagate to an entity residing outside the bounded definition of the service group 420. A data center may include multiple service groups 420. A service group definition specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
  "service_group": [
    {
      "cells": [ ],
      "description": "Service group Service Instance Definitions",
      "service_group_id": "id1",
      "name": "name1",
      "schema_version": "1.0",
      "cluster_instances": [
        {
          "cluster_instance_name": "cluster1",
          "cluster_type": "cluster_type1"
        },
        {
          "cluster_instance_name": " cluster2",
          "cluster_type": " cluster_type1"
        },
        {
          "cluster_instance_name": " cluster3",
          "cluster_type": " cluster_type2"
        }
      ],
      "service_instances": [
        {
          "service_instance_name": "serviceinstance0001",
          "service_type": "servicetype1"
        },
        {
          "service_instance_name": "serviceinstance0002",
          "service_type": " servicetype1"
          "cluster_instance": "cluster1"
        },
        {
          "service_instance_name": "serviceinstance0003",
          "service_type": " servicetype2"
        },
        ...
      ],
      "service_teams": ["team1"],
      "type": "servicetype"
      "security_groups":[
        {
          "name":"group1",
          "policies":[
            {
              "description":"Allow access from site S1",
              "destination":{ "groups":[ "group2" ] },
              "environments":[ "dev", "test", "staging" ],
              "source":{
                "iplist":"URL1",
                "filters":[ filter-expression ]
              }
            }
          ]
        }
      ]
    }
  ]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module generates instructions for the cloud platform that implement specific network policies using cloud platform specific features and network functionality such that the network policies implement the security policies specified in the declarative specification.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other.

A service definition specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition specifies an attribute outbound access that specifies destination endpoints, for example, external URLs (uniform resource locators) specifying that the service needs access to the specified external URLs. During deployment, the data center generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
  "service_definition": [
    {
      "authorized clients": [ ],
      "build dependencies": [ ],
      "description": "description of service",
      "dns_name": "dns1",
      "documentation": "URL",
      "name": "name1",
      "namespace": "space1",
      "service_owner": "user1",
      "service_status": "GA",
      "service_team": "team1",
      "support_level": "STANDARD",
      "start_dependencies": ["svc5", "svc7", ... ],
      "sub_services": [ "service1", " service2", " service3", ... ],
        "listening_ports":[
            { "protocol":"tcp", "ports":[ "53" ] },
            { "protocol":"udp","ports":[ "53" ] }
          "outbound_access":[
            {
              "destination":[
                {
                  "endpoints":[ ".xyz.com:443", ".pqr.com:443"]
                }
              ]
            }
          ],
      }
    ]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 210 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center through out the design process thereby resulting in the organizational structure having an impact on the design of the data center or service group as stated by Conwoy's law. Conwoy's law states that organizations which design systems are constrained to produce designs which are copies of the communication structures of these organizations. Embodiments decouple the team definition from the constructions that define the data center entity, thereby reducing the impact of the teams on the design and architecture of the data center entity.

```
{
  "team_definition": [
    {
      "name": "team1",
      "description": "description of team",
      "admins": [
        "user1",
        "user2",
        "user3",
        "user4",
        ...
      ],
      "team_id": "id1",
      "owner": "owner_id",
      "email": "team1@xyz.com",
    }
  ],
  "communication_channel": "channel1"
  "schema_version": "1.0"
}
```

An environment definition 460 specifies a type of system environment represented by the data center, for example, development environment, staging environment, test environment, or production environment. A schema definition 470 specifies schema that specifies syntax of specific data center entity definitions. The schema definition 470 is used for validating various data center entity definitions. The data center generation module determines security policies for the data center in the cloud platform specific metadata representation 235 based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A data center definition 420 specifies the attributes and components of a data center instance. A declarative specification may specify multiple data center instances. The data center definition 420 specifies attributes including a name, description, a type of environment, a set of service groups, teams, domain name servers for the data center, and so on. A data center definition may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition includes a list of service groups included in the data center instance and other attributes including an environment of the data center, a data center identifier, a name, a region representing a geographical region, one or more teams associated with the data center, and a schema version.

```
{
    "datacenter_instance": {
        "environment": "env1",
        "datacenter_instance_identifier": "id1",
        "name": "data_center1",
        "region": "region1",
        "service_groups": [
            "service_group1",
            " service_group2",
            " service_group3",
            "service_group4",
            ...
        ],
        "schema_version": "1.0",
        "admin_team":"admins",
        ...
    }
  }
}
```

Figure 5:
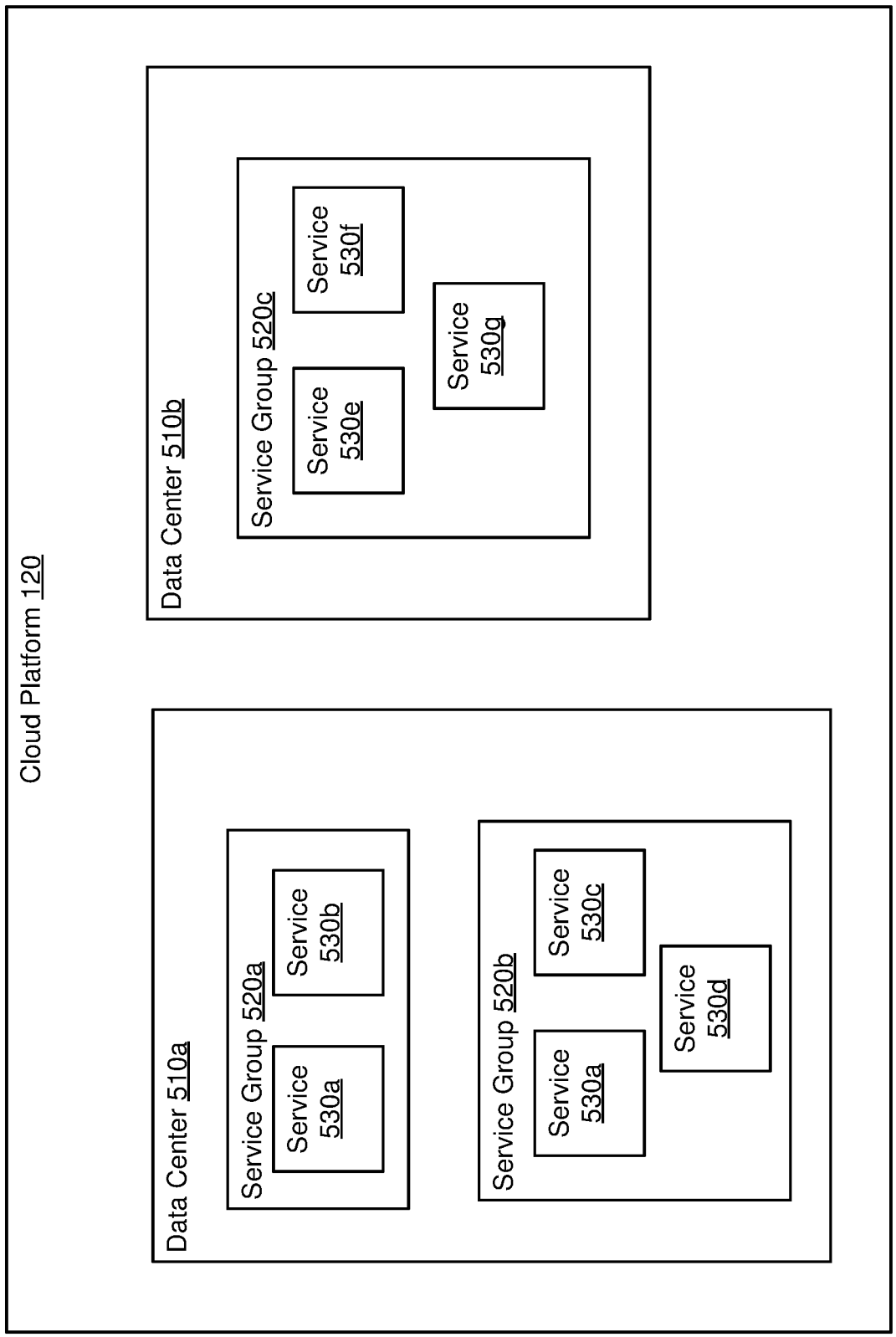
FIG. 5 illustrates example data centers created on a cloud platform based on a declarative specification, according to one embodiment.

FIG. 5 illustrates some example data centers created on a cloud platform based on a declarative specification according to one embodiment. The data centers 510 may be created based on a declarative specification processed by the data center generation module 210. As shown in FIG. 5, multiple data centers may be configured within a cloud platform 120. Each data center 510 may correspond to a tenant 115 of a multi-tenant system 110. A tenant 115 may create one or more data centers 510. Alternatively, a data center 510 may be created by any computing system. Each data center includes one or more service groups. For example, data center 510a includes service groups 520a and 520b and data center 510b includes service group 520c. A data center may include multiple instances of a particular type of service group. Each service group includes a set of services. For example, service group 520a includes services 530a and 530b, service group 520b includes services 530a, 530b, and 530c, and service group 520c includes services 530e, 530f, and 530g. A service group may include multiple instances of services of the same service type.

Figure 6:
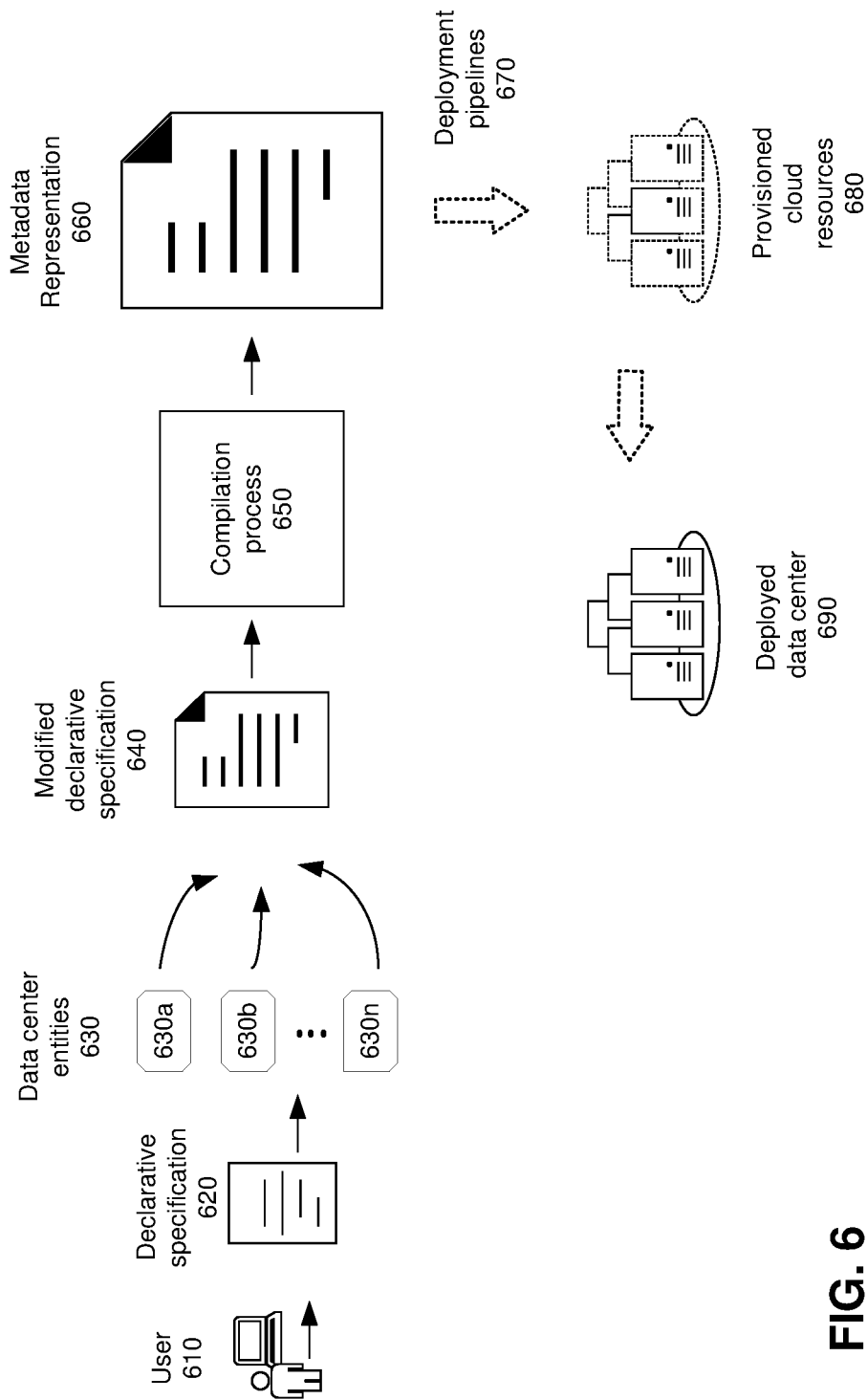
FIG. 6 is a block diagram illustrating generation of a platform-specific metadata representation of a data center that is ready for provisioning and deployment on a target cloud-based platform, according to one embodiment.

FIG. 6 is a block diagram illustrating generation of a platform-specific metadata representation of a data center, from a platform-independent declarative specification of the data center, that is ready for provisioning and deployment on a target cloud-based platform, according to one embodiment. Examples of a target public cloud-based platform include, for example, Amazon Web Services™ (AWS™), Google Cloud Platform™ (GCP™), Azure™ etc.

A user 610 provides a high-level declarative specification 620 of a desired data center for provisioning and deployment on a target cloud-platform. In some embodiments, the user 610 may represent a tenant of a multi-tenant system that operates on a public or private cloud environment. The user 610 may represent a commercial enterprise that seeks to move their infrastructure from traditional data centers to a target public cloud platform. The user 610 may provide the declarative specification 620 using any client device.

The declarative specification 620 may include any of: service specifications, networking specifications, engineering specifications, security specifications, and environment specification, etc. The declarative specification 620 is used to construct a set of data center entities 630 (630a, 630b, 630n). The data center entities 630 are composed of metadata describing elements of a particular data center. The metadata may be multiple different entity declarations that act as basic building blocks for constructing a platform-specific metadata representation of the data center 660. For example, an entity may include definitions of computational services that are required to be run on the finally deployed data center, may include logical entities that define boundaries, such as for example, networking requirements, security constraints, etc. In some embodiments, the construction of the data center entities 630 may be partially or entirely hand-crafted by a set of corresponding data center entity owner teams. The construction of the data center entities 630 may involve performing one or more changes in a set of changes to the declarative specification 620. In some embodiments, the construction of the data center entities 630 from the declarative specification 620 may be performed automatically.

In embodiments described herein, the data center entities 630 are assembled into a modified declarative specification 640. The modified declarative specification 640 is a platform-independent declarative specification that captures high level service metadata, networking specifications, engineering specifications, security requirements, and environment information based on the declarative specification 620.

The system compiles the modified platform-independent declarative specification 640 to generate a metadata representation 660 that is a platform-specific metadata representation of the data center. In embodiments described herein, generation of the platform-specific metadata representation is an automated process. The system automates the process of transforming the modified platform-independent declarative specification 640 through an automated compilation process 650 to generate metadata representation 660 that is a platform-specific metadata representation of the data center.

The platform-specific metadata representation 660 provides instructions to deployment pipelines 670 for provisioning cloud resources 680 and for generating a deployed data center 690 based on the provisioned cloud resources 680 on the target cloud platform.

The conversion of the metadata declarative specification 640 to the metadata representation 660 though compilation, and subsequently through the deployment pipelines 670 to the provisioned cloud resources 680 and the deployed data center 690 is automated. The automation enables speed of data center deployment through faster execution and removes the risk of human error such as manual misconfiguration. Furthermore, the automation increases reliability in the final deployed data center 690 on the target cloud-platform.

The modified platform-independent declarative specification 640 may receive further sets of changes to the metadata. A particular set of changes to the metadata may result in a particular modified platform-independent declarative specification 640, which will get compiled into a particular platform-specific metadata representation and may be used for a particular provisioning of cloud resources and a particular deployment of the data center. Thus, there may be multiple sets of associated modified platform-independent declarative specification 640, platform-specific metadata representation 660, provisioned cloud resources 680, and deployed data centers 690, each set associated with a particular set of changes to the platform-independent declarative specification 640. However, it is important to ensure that the changes made to the data center entities during the entire chain of transformations from the crafted data center entities 630 to the deployed data center 670 can be tracked. This will ensure that an audit query related to changes made to a data center entity associated with any of the platform-specific metadata representation, provisioned cloud resources, or a deployed data center can be tracked back to the changes made in the declarative specification 640. This is ensured by an audit and tracking process that is described below.

Audit and Tracking Process

Figure 7:
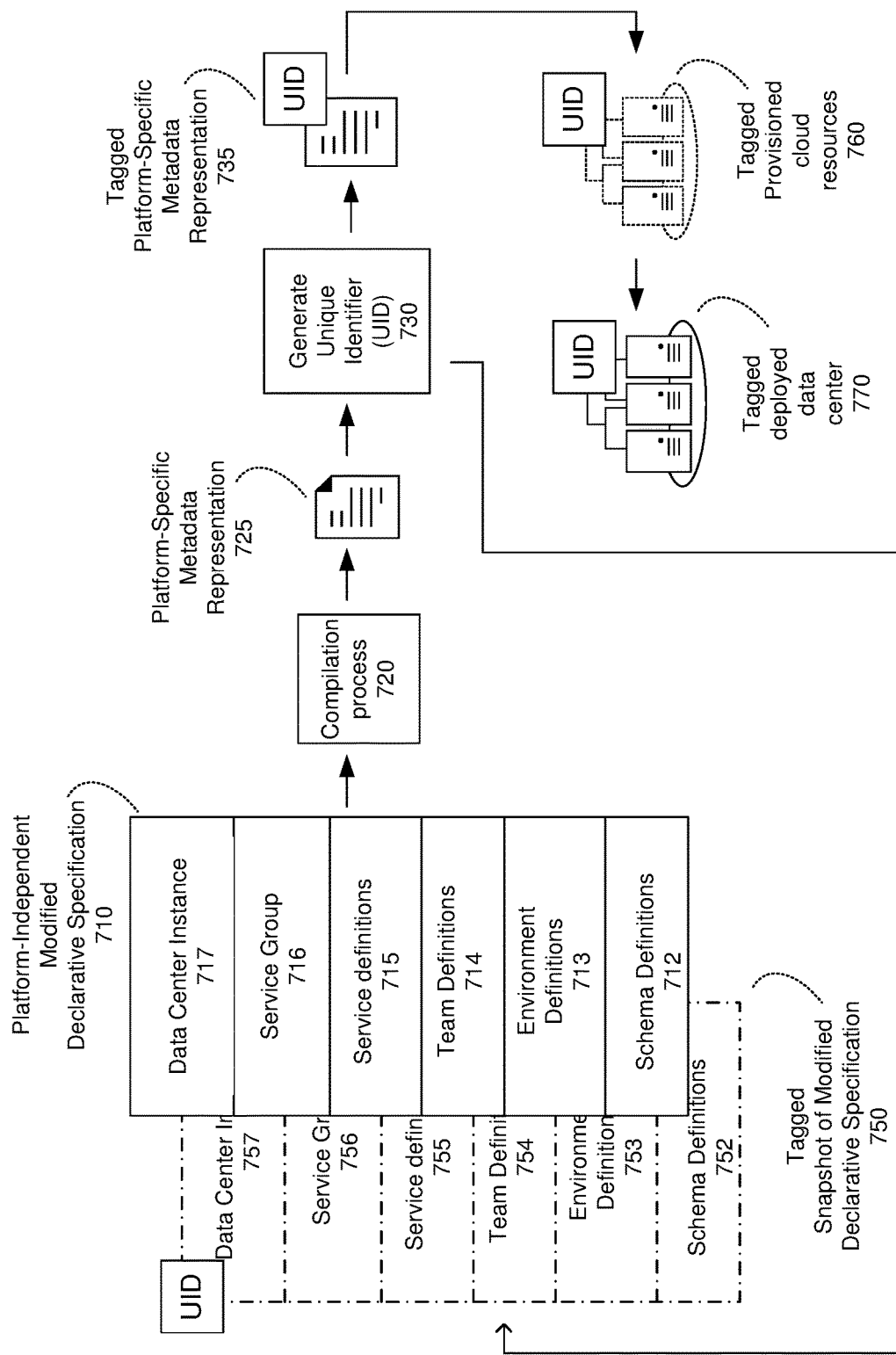
FIG. 7 illustrates an example process to facilitate auditing of changes made to the platform-independent declarative specification of a data center, according to one embodiment.

FIG. 7 illustrates an example process to facilitate auditing of changes made to the platform-independent declarative specification of a data center, according to one embodiment.

FIG. 7 depicts a modified platform-independent declarative specification 710 that that may be generated based on changes to data center entity definitions (such as data center entities 630 depicted in FIG. 6). The data center entity definitions may be a hierarchically defined set of definitions (such as described with respect to FIG. 4). The data center entity definitions depicted in the modified platform-independent declarative specification 710 include schema definitions 712, environment definitions 713, team definitions 714, service definition 715, service group 716, and data center instance 717.

The declarative specification 710 undergoes a compilation process 720 to generate a platform-specific metadata representation 725, as described with respect to FIG. 6. In embodiments described herein, before the compilation process 720 executes, an audit system generates and stores a snapshot of the modified platform-independent declarative specification 710. Furthermore, the system generates 730 a unique identifier (UID) and tags 740 the generated snapshot of the modified platform-independent declarative specification with this unique identifier. In embodiments described herein, the tagging is immutable, thereby enabling metadata such as the data center entity definitions describing a data center to be snapshot, stored and retrieved for recreating the history of changes that are made to the metadata definitions of the data center.

Thus, the tagged snapshot of the modified declarative specification 750 is associated with the unique identifier. The tagged and stored snapshot of the modified declarative specification 750 includes copies of the various data center entity definitions such as schema definitions 752, environment definitions 753, team definitions 754, service definition 755, service group 756, and data center instance 757.

Subsequent to the compilation process, the generated platform-specific metadata representation 725 is also tagged with the unique identifier to generate a tagged generated platform-specific metadata representation 735. When the tagged platform-specific metadata representation is used to provision cloud resources, the provisioned cloud resources are tagged to generate tagged provisioned cloud resources 760. Likewise, when the provisioned cloud resources are used to generate a deployed data center, the deployed data center is tagged to generate a tagged deployed data center 770.

In the example depicted herein, audit tracking may be performed as follows:

The audit system receives a query regarding a data center entity. Furthermore, the query may be further associated with any of: the deployed data center 770, the provisioned cloud resource 760, or the metadata representation 735.

The audit system retrieves a tag (i.e., UID) from the associated deployed data center 770, or provisioned cloud resource 760, or the metadata representation 735, and retrieves the tagged snapshot of the modified declarative specification 750.

the audit system subsequently retrieves information regarding the specific queried data center entity, such as schema definitions 752, environment definitions 753, team definitions 754, service definition 755, service group 756, and data center instance 757, from the tagged snapshot 750.

The audit system provides the retrieved information in response to the audit query.

Auditing System Architecture

Figure 8:
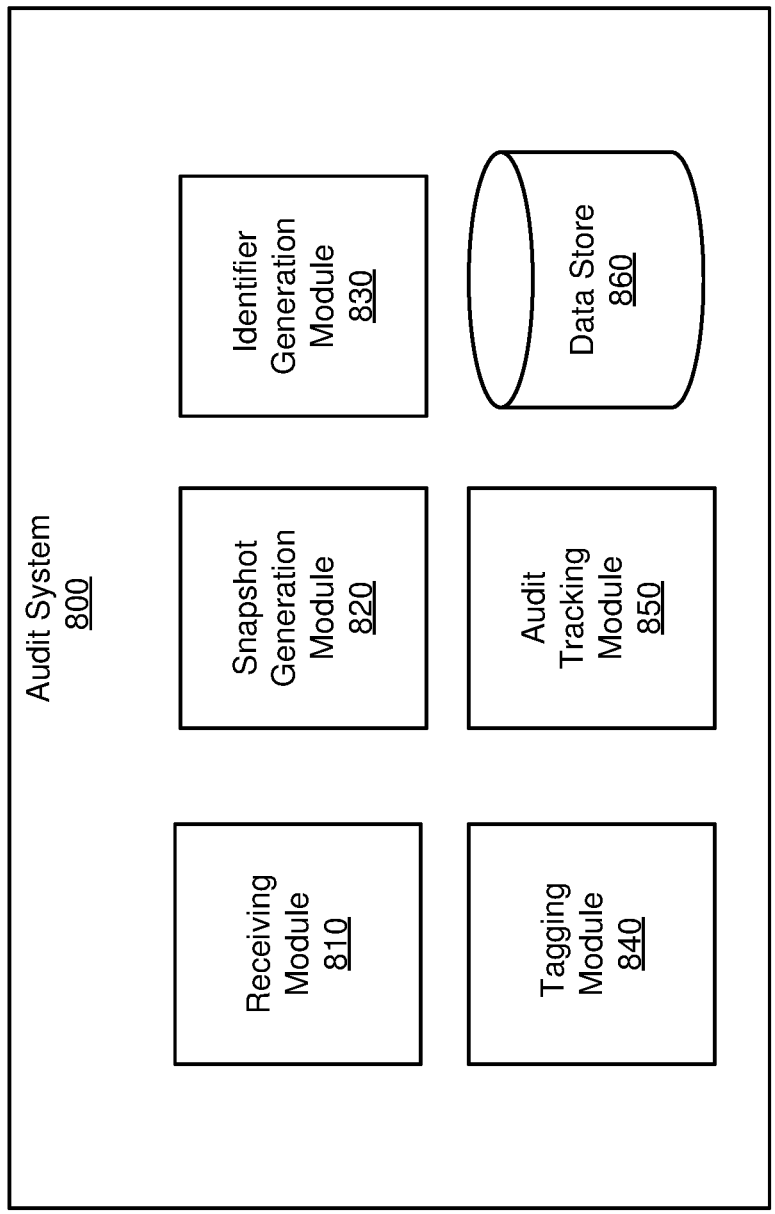
FIG. 8 is a block diagram illustrating components of a system for performing auditing of changes made to the platform-independent declarative specification of a data center, according to one embodiment.

FIG. 8 is a block diagram illustrating modules of an audit system 800 for performing auditing during the generation of the datacenter, according to one embodiment. The audit system 800 described herein is an embodiment of the audit system 250 described with respect to FIG. 2.

The audit system 800 includes a receiving module 810, a snapshot generation module 820, a identifier generation module 830, a tagging module 840, an audit tracking module 850, and a data store 860. Alternative configurations of the audit system 800 may include different and/or additional modules. Functionality that is indicated as being performed by a particular module may be performed by other modules than those indicated herein. Furthermore, steps of any processes described herein can be performed in an order different from that illustrated herein.

The receiving module 810 is configured to receive a platform-independent declarative specification of the data center and an identification of the target cloud platform. The receiving module 810 is also configured to receive a modified platform-independent declarative specification of the data center based on a set of one or more changes to the platform-independent declarative specification. The set of changes to the platform-independent declarative specification are changes to data center entity definitions describing the platform-independent declarative specification. In some embodiments, the receiving module may store the received platform-independent declarative specification, the identity of the target cloud platform, and the modified platform-independent declarative specification in the data store 860.

The snapshot generation module 820 retrieves the set of entity definitions describing the modified platform-independent declarative specification for a desired data center. The set of entity definitions (e.g., as described in the text associated with FIG. 4) is generated based on a platform independent declarative specification of the data center and a target cloud platform that are specified by a user. The set of entity definitions may be based on a set of one or more changes made to data center entities based on the platform independent declarative specification from the user. In some embodiments, the entity definitions may be partially or entirely hand-crafted by a set of corresponding entity owner teams and stored in the data store 860. In some embodiments, the entity definitions may be automatically generated upon receiving the cloud-platform independent declarative specification of the data center and the target cloud platform and stored in the data store 850. In some embodiments, the snapshot generation module 820 may retrieve the set of entity definitions from the data store 860.

Before the modified platform-independent declarative specification undergoes a compilation process to generate a platform-specific metadata representation, the snapshot generation module 820 generates a snapshot of the modified platform-independent declarative specification and stored this generated snapshot. In some embodiments, the generated snapshot may be a copy of a set of repositories that store the entity definitions. In other embodiments, the generated snapshot may involve storing incremental changes to a previous platform-independent declarative specification which may subsequently be combined with the previous platform-independent declarative specification to generate a copy of the modified platform-independent declarative specification. Thus, as described with respect to FIG. 4, the generated and stored snapshot may include definitions of various types of data center entities including service groups, services, teams, environments, and schemas associated with the modified declarative specification includes one or more instances of data centers. In an embodiment, the generated snapshot of the declarative specification may use hierarchical objects, for example, JSON (Javascript object notation) that conform to a predefined schema.

As noted previously, a particular set of changes to the declarative specification may result in a particular modified platform-independent declarative specification, which will get compiled into a particular platform-specific metadata representation and may be used for a particular provisioning of cloud resources and a particular deployment of the data center. Thus, for every modified platform-independent declarative specification that is associated with a particular set of changes to the platform-independent declarative specification, the snapshot generation module 820 will store a generated snapshot of the associated entity definitions in a set of repositories that are hosting the metadata. In an embodiment, the generated snapshots will be stored in in the data store 860.

The identifier generation module 830 generates a unique identifier when the snapshot module 820 generates and stores a snapshot of the modified platform-independent declarative specification. In some embodiments, the module 830 generates the unique identifier as a timestamp that is associated with a generation of the snapshot. In some embodiments, the module 830 generates the timestamp generated as a combination of any of: a year value, a month value, a day value, an hour value, a minute value, and a second value. In some embodiments, the module 830 may employ any other methodology to generate a unique identifier (e.g., use a pseudorandom number generator, etc.). The module 830 may store the generated unique identifier in the data store 860.

The tagging module 840 tags (i.e., labels, marks, identifies) the generated and stored snapshot of the modified platform-independent declarative specification with the unique identifier. In some embodiments, the tagging module 840 may retrieve the unique identifier for tagging from the data store 860. In some embodiments, the tagging module 840 may receive the unique identifier directly from the module 830. When the modified platform-independent declarative specification is compiled to generate the platform-specific metadata representation, the tagging module 840 additionally tags the platform-specific metadata representation with the unique identifier. When the platform-specific metadata representation is used for provisioning cloud resources, the tagging module 840 additionally tags the provisioned cloud resources with the unique identifier. Similarly, when the provisioned cloud resources are used for a deployment of the actual data center, the tagging module 840 additionally tags the deployed data center with the unique identifier. The tagging performed by the tagging module 840 is immutable, thereby enabling metadata such as the data center entity definitions describing a data center to be snapshot, stored and retrieved for recreating the history of changes that are made to the metadata definitions of the data center.

The audit tracking module 850 may receive an audit query or request that is associated with one or more data center entities, such as the data center entities described in association with FIG. 4. The audit tracking module 850 may receive this audit query in association with a particular platform-specific metadata representation, a particular provisioning of cloud resources, or with a particular deployed data center. The module 850 first retrieves the identifier that is associated with the queried representation, i.e., the identifier with which the particular platform-specific metadata representation, particular provisioning of cloud resources, or particular deployed data center is tagged. The module 850 subsequently retrieves the stored snapshot of entity definitions that is also associated with the same identifier. The module 850 then searches for all the information that is associated with the queried data center entity stored within the retrieved snapshot and provides this information in response to the received audit query.

The data store 860 stores information for the audit system 800. The stored data may include the set of entity definitions that form the modified platform independent declarative specification of the data center. In some embodiments, the data store 860 may store only the most recent set of entity definitions as received from the entity owner teams. In some embodiments, the data store 860 may store each generated unique identifier in association with a modified platform-independent declarative specification. In some embodiments, the data store 860 may store the generated snapshots.

The data store 870 is a memory, such as a read only memory (ROM), dynamic random-access memory (DRAM), static random-access memory (SRAM), or some combination thereof. In some embodiments, the various modules of the audit system 800 may pass various data values directly to each other. In some embodiments, the various modules of the audit system 800 may store data in the data store 860 and retrieve data as needed from the data store 860.

Auditing and Tracking Process

Figure 9:
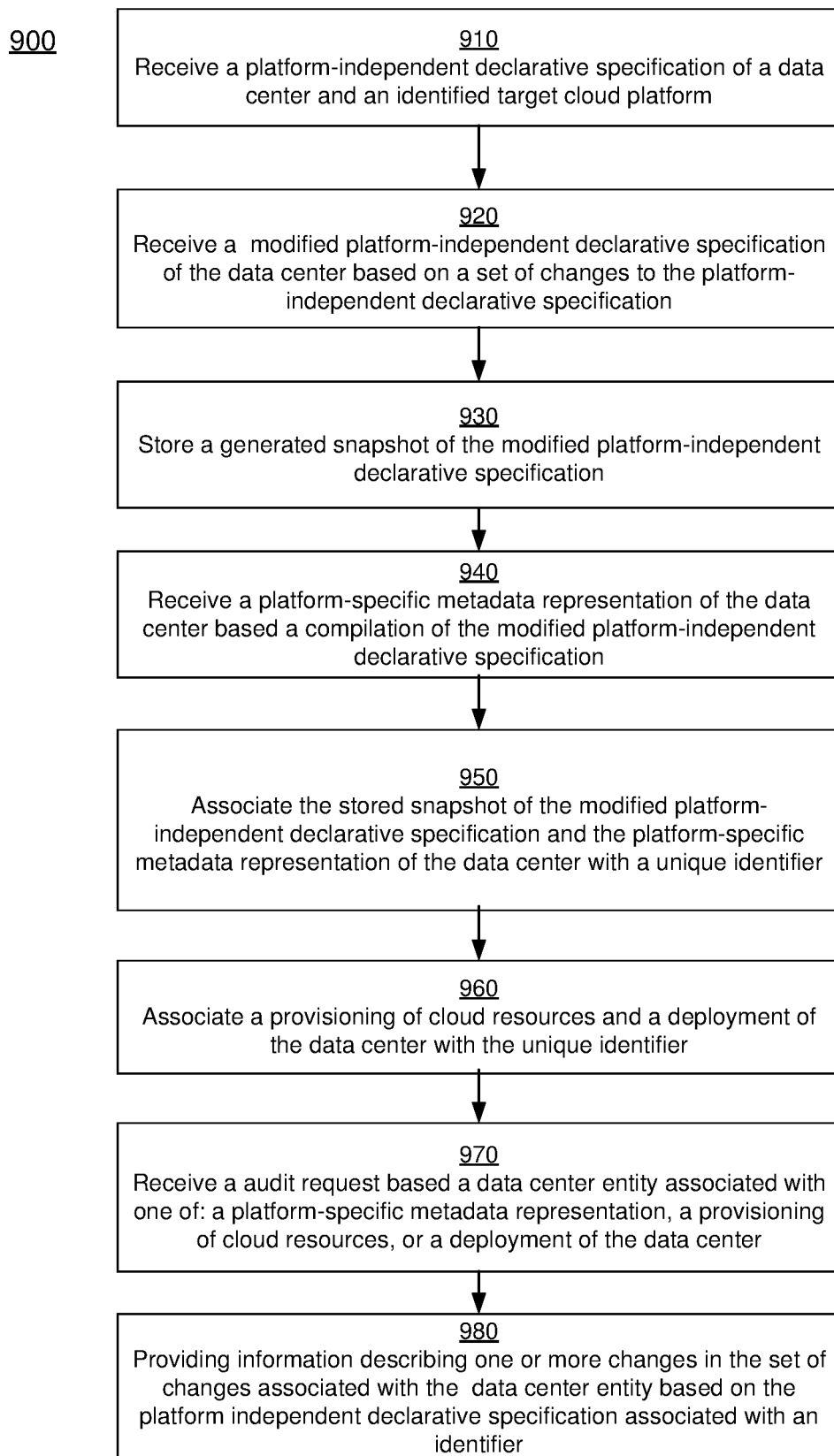
FIG. 9 is a flow chart illustrating the process for performing auditing of changes in the platform-independent declarative specification of a data center, according to one embodiment.

FIG. 9 is a flow chart for illustrating the process for auditing changes made to a declarative specification of a data center data using the audit system 800 (shown in FIG. 8), according to one embodiment. The process illustrated herein is performed by the system 800. Various embodiments can perform the steps of FIG. 8 in different orders than those indicated herein. Moreover, other embodiments can include different and/or additional steps than the ones described herein.

The audit system 800 is configured to receive 910 a platform-independent declarative specification of a data center as well as an identified target platform.

The audit system 800 is configured to receive 920 a modified platform-independent declarative specification of the data center based on a set of one or more changes to data center entities defining the platform-independent declarative specification.

The audit system 800 is configured to store 930 a generated snapshot of the modified platform-independent declarative specification.

The audit system 800 is configured to receive 940 a platform-specific metadata representation of the data center based on a compilation of the modified platform-independent declarative specification.

The audit system 800 is configured to associate 950 the stored snapshot of the modified platform-independent declarative specification as well as the platform-specific metadata representation of the data center with a unique identifier.

In response to a provisioning of cloud resources based on the platform-specific metadata representation, the audit system is configured to associate 960 the provisioning of cloud resources with the unique identifier. In response to a deployment of the data center based on the platform-specific metadata representation, the audit system is configured to associate 960 the deployment of the data center with the unique identifier.

The audit system 800 is configured to receive 970 an audit request based a data center entity associated with one of: a platform specific metadata representation of the data center, a provisioning of cloud resources, or a deployment of the data center. When the request is associated with a platform specific metadata representation of the data center, the system 800 determines the identifier associated with the platform-specific metadata representation. When the request is associated with provisioned cloud resources, the system 800 determines the identifier associated with the provisioned cloud resources. When the request is associated with a deployed data center, the system 800 determines the identifier associated with the deployed data center. Subsequently, the audit system 800 is configured to access the generated snapshot of the modified platform-independent declarative specification corresponding to the identifier. The audit system determines the one or more changes in the set of changes associated with the data center entity from the accessed snapshot and is configured to provide 980 information describing the one or more changes in response to the audit request.

The audit system 800 is also configured to receive a next modified platform-independent declarative specification of the data center based on a next set of one or more changes to the modified platform-independent declarative specification, store a generated snapshot of the next modified platform-independent declarative specification, a next platform-specific metadata representation of the data center based on a compilation of the next modified platform-independent declarative specification, associate the next platform-specific metadata representation of the data center with a next unique identifier, and associate the stored snapshot of the next modified platform-independent declarative specification with the next unique identifier. In response to a next provisioning of cloud resources based on the next platform-specific metadata representation, the audit system is configured to associate the next provisioning of cloud resources with the next unique identifier. In response to a next deployment of the data center based on the next platform-specific metadata representation, the audit system is configured to associate the next deployment of the data center with the next unique identifier. The snapshot generation and tagging described herein ensure that changes made to data center entities in the declarative specification may be tracked through the entire chain of transformations from a platform-independent declarative specification all the way to a deployed data center.

The processes described above can be implemented on different types of computer systems, including multi-tenant computer systems. In a multi-tenant computer system, multiple tenants share the use of a computer system, but without access or knowledge to each other's data or activities. Each tenant may be an enterprise. As an example, one tenant might be a company that employs multiple salespersons, where each salesperson uses a client device to manage their sales process. Thus, a user might maintain contact data, leads data, customer follow-up data, performance data, goals and progress data, etc., all applicable to that user's personal sales process.

Computer Architecture

Figure 10:
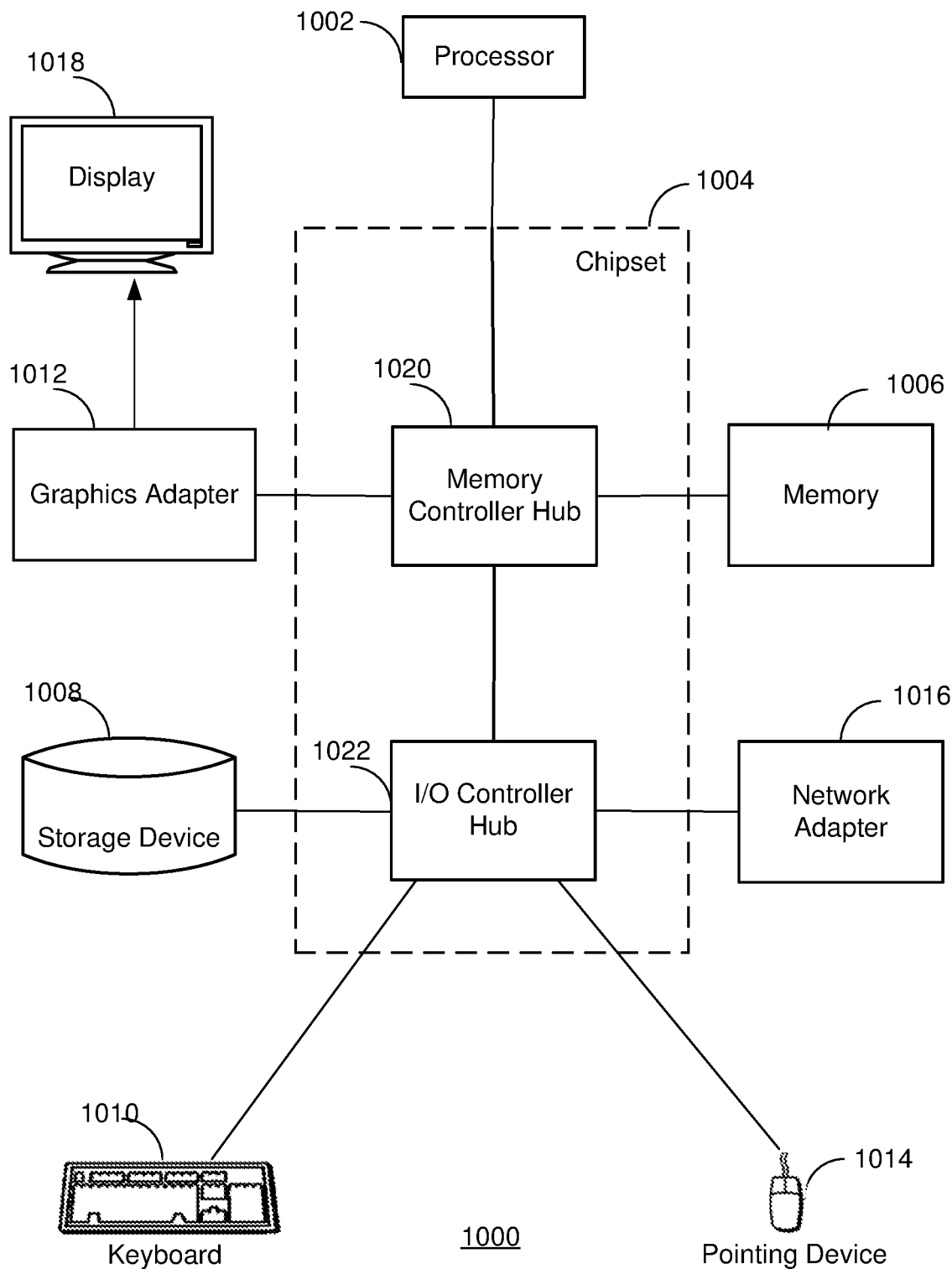
FIG. 10 is a block diagram illustrating the architecture of a typical computer system for use in the environment of FIG. 8 and FIG. 10 according to one embodiment.

FIG. 10 is a block diagram illustrating the architecture of a typical computer system 1000 for use in the environments of FIG. 8 according to one embodiment. Illustrated are at least one processor 1002 coupled to a chipset 1004. Also coupled to the chipset 1004 are a memory 1006, a storage device 1008, a keyboard 1010, a graphics adapter 1012, a pointing device 1014, and a network adapter 1016. A display 1018 is coupled to the graphics adapter 1012. In one embodiment, the functionality of the chipset 1004 is provided by a memory controller hub 1020 and an I/O controller hub 1022. In another embodiment, the memory 1006 is coupled directly to the processor 1002 instead of the chipset 1004.

The storage device 1008 is a non-transitory computer-readable storage medium, such as a hard drive, compact disk read-only memory (CD-ROM), DVD, or a solid-state memory device. The memory 1006 holds instructions and data used by the processor 1002. The pointing device 1014 may be a mouse, track ball, or other type of pointing device, and is used in combination with the keyboard 1010 to input data into the computer system 1000. The graphics adapter 1012 displays images and other information on the display 1018. The network adapter 1016 couples the computer system 1000 to a network.

As is known in the art, a computer system 1000 can have different and/or other components than those shown in FIG. 10. In addition, the computer system 1000 can lack certain illustrated components. For example, a computer system 1000 acting as an online system 800 or 1000 may lack a keyboard 1010 and a pointing device 1014. Moreover, the storage device 1008 can be local and/or remote from the computer 1000 (such as embodied within a storage area network (SAN)).

The computer system 1000 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1008, loaded into the memory 1006, and executed by the processor 1002.

The types of computer systems 1000 used by the system of FIGS. 8 and 10 can vary depending upon the embodiment and the processing power used by the entity. For example, a client device may be a mobile phone with limited processing power, a small display 1018, and may lack a pointing device 1014. The online system 800 in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

We claim:

1. A computer-implemented method for provisioning resources on a target cloud platform based on a platform-independent declarative specification of a data center, the method comprising:
    receiving the platform-independent declarative specification of the data center and an identification of the target cloud platform;
    identifying one or more data center entities represented within the platform-independent declarative specification;
    generating data structures and metadata representations of the one or more data center entities;
    generating instructions for provisioning services or deploying applications associated with one or more services on the target cloud platform based on the data structures and metadata representations of the one or more data center entities according to the platform-independent declarative specification;
    sending the generated instructions for execution on the target cloud platform, wherein the target cloud platform executes the instructions to configure the data center; and
    providing users with access to computing resources of the data center configured by the target cloud platform.

2. The computer-implemented method of claim 1, wherein the platform-independent declarative specification specifies metadata describing a service group, the service group comprising at least one of: a set of one or more capabilities, a set of one or more features, and a set of one or more services, and wherein the set of one or more capabilities, features, and services are built and delivered independent of other service groups.

3. The computer-implemented method of claim 2, further comprising receiving a modification to a capability, a feature, or a service within the service group, wherein the modification propagates to one or more data center entities within the service group but does not propagate to a data center entity residing outside a bounded definition of the service group.

4. The computer-implemented method of claim 3, wherein the bounded definition of the service group specifies attributes comprising one or more of: a name, description, an identifier, schema version, and a set of service instances.

5. The computer-implemented method of claim 1, wherein the platform-independent declarative specification specifies metadata describing an attribute of a service, the attribute of the service representing one or more of: name of the service; description of the service; location of documentation for the service; one or more sub-services associated with the service; an owner for the service; a team associated with the service; build dependencies for the service specifying one or more other services on which the service depends at build time; start dependencies of the service specifying one or more other services that should be running when the service is started; authorized clients; domain name server name associated with the service; a service status; and a support level for the service.

6. The computer-implemented method of claim 1, wherein the platform-independent declarative specification specifies metadata describing an attribute of a team, the attribute of the team representing one or more of: a name of the team; an email for the team; a communication channel for the team; and one or more members of the team.

7. The computer-implemented method of claim 1, wherein the platform-independent declarative specification specifies metadata describing a system environment, wherein the system environment is one of: a development environment; a staging environment; a test environment; or a production environment.

8. The computer-implemented method of claim 1, wherein the platform-independent declarative specification specifies metadata describing a schema, wherein the schema specifies a syntax associated with one or more data center entities.

9. A non-transitory computer readable storage medium for storing instructions that when executed by a computer processor cause the computer processor to perform steps for provisioning resources on a target cloud platform based on a platform-independent declarative specification of a data center, the steps comprising:
receiving the platform-independent declarative specification of the data center and an identification of the target cloud platform;
identifying one or more data center entities represented within the platform-independent declarative specification;
generating data structures and metadata representations of the one or more data center entities;
generating instructions for provisioning services or deploying applications associated with one or more services on the target cloud platform based on the data structures and metadata representations of the one or more data center entities according to the platform-independent declarative specification;
sending the generated instructions for execution on the target cloud platform, wherein the target cloud platform executes the instructions to configure the data center; and
providing users with access to computing resources of the data center configured by the target cloud platform.

10. The computer readable storage medium of claim 9, wherein the platform-independent declarative specification specifies metadata describing a service group, the service group comprising at least one of: a set of one or more capabilities, a set of one or more features, and a set of one or more services, and wherein the set of one or more capabilities, features, and services are built and delivered independent of other service groups.

11. The computer readable storage medium of claim 10, further comprising receiving a modification to a capability, a feature, or a service within the service group, wherein the modification propagates to one or more data center entities within the service group but does not propagate to a data center entity residing outside a bounded definition of the service group.

12. The computer readable storage medium of claim 11, wherein the bounded definition of the service group specifies attributes comprising one or more of: a name, description, an identifier, schema version, and a set of service instances.

13. The computer readable storage medium of claim 9, wherein the platform-independent declarative specification specifies metadata describing an attribute of a service, the attribute of the service representing one or more of: name of the service; description of the service; location of documentation for the service; one or more sub-services associated with the service; an owner for the service; a team associated with the service; build dependencies for the service specifying one or more other services on which the service depends at build time; start dependencies of the service specifying one or more other services that should be running when the service is started; authorized clients; domain name server name associated with the service; a service status; and a support level for the service.

14. The computer readable storage medium of claim 9, wherein the platform-independent declarative specification specifies metadata describing an attribute of a team, the attribute of the team representing one or more of: a name of the team; an email for the team; a communication channel for the team; and one or more members of the team.

15. The computer readable storage medium of claim 9, wherein the platform-independent declarative specification specifies metadata describing a system environment, wherein the system environment is one of: a development environment; a staging environment; a test environment; or a production environment.

16. The computer readable storage medium of claim 9, wherein the platform-independent declarative specification specifies metadata describing a schema, wherein the schema specifies a syntax associated with one or more data center entities.

17. A computer system comprising:
a computer processor; and
a non-transitory computer readable storage medium for storing instructions that when executed by a computer processor cause the computer processor to perform steps for provisioning resources on a target cloud platform based on a platform-independent declarative specification of a data center, the steps comprising:
receiving the platform-independent declarative specification of the data center and an identification of the target cloud platform;

identifying one or more data center entities represented within the platform-independent declarative specification;

generating data structures and metadata representations of the one or more data center entities;

generating instructions for provisioning services or deploying applications associated with one or more services on the target cloud platform based on the data structures and metadata representations of the one or more data center entities according to the platform-independent declarative specification;

sending the generated instructions for execution on the target cloud platform, wherein the target cloud platform executes the instructions to configure the data center; and providing users with access to computing resources of the data center configured by the target cloud platform.

18. The system of claim 17, wherein the platform-independent declarative specification specifies metadata describing a service group, the service group comprising at least one of: a set of one or more capabilities, a set of one or more features, and a set of one or more services, and wherein the set of one or more capabilities, features, and services are built and delivered independent of other service groups.

19. The system of claim 17, wherein the platform-independent declarative specification specifies metadata describing an attribute of a service, the attribute of the service representing one or more of: name of the service; description of the service; location of documentation for the service; one or more sub-services associated with the service; an owner for the service; a team associated with the service; build dependencies for the service specifying one or more other services on which the service depends at build time; start dependencies of the service specifying one or more other services that should be running when the service is started; authorized clients; domain name server name associated with the service; a service status; and a support level for the service.

20. The system of claim 17, wherein the platform-independent declarative specification specifies at least one of:

metadata describing an attribute of a team, the attribute of the team representing one or more of: a name of the team; an email for the team; a communication channel for the team; and one or more members of the team; and metadata describing a system environment, wherein the system environment is one of: a development environment; a staging environment; a test environment; or a production environment.

* * * * *